United States Patent
Wang et al.

(10) Patent No.: US 11,981,819 B2
(45) Date of Patent: May 14, 2024

(54) DISPERSE DYE COLOR PASTE FOR WATERLESS DYEING, AND PREPARATION METHOD AND APPLICATION THEREOF

(71) Applicant: ZHEJIANG GREEN UNIVERSE TEXTILE TECHNOLOGY CO., LTD., Zhejiang (CN)

(72) Inventors: JiPing Wang, Zhejiang (CN); Liujun Pei, Zhejiang (CN); Zhenhua Wu, Zhejiang (CN)

(73) Assignee: ZHEJIANG GREEN UNIVERSE TEXTILE TECHNOLOGY CO., LTD., Zhejiang (CN)

( * ) Notice: Subject to any disclaimer, the term of this patent is extended or adjusted under 35 U.S.C. 154(b) by 112 days.

(21) Appl. No.: 17/780,602

(22) PCT Filed: Dec. 20, 2019

(86) PCT No.: PCT/CN2019/126807
§ 371 (c)(1),
(2) Date: May 27, 2022

(87) PCT Pub. No.: WO2021/103220
PCT Pub. Date: Jun. 3, 2021

(65) Prior Publication Data
US 2022/0298355 A1 Sep. 22, 2022

(30) Foreign Application Priority Data
Nov. 29, 2019 (CN) .......................... 201911198903.4

(51) Int. Cl.
| | | |
|---|---|---|
| *C09B 65/00* | (2006.01) | |
| *C09B 67/00* | (2006.01) | |
| *C09B 67/38* | (2006.01) | |
| *D06P 1/16* | (2006.01) | |
| *D06P 3/82* | (2006.01) | |
| *D06P 3/26* | (2006.01) | |
| *D06P 3/36* | (2006.01) | |

(52) U.S. Cl.
CPC ........ *C09B 67/008* (2013.01); *C09B 67/0001* (2013.01); *D06P 1/16* (2013.01); *D06P 3/8233* (2013.01); *D06P 3/26* (2013.01); *D06P 3/36* (2013.01)

(58) Field of Classification Search
CPC .............. C09B 67/008; C09B 67/0001; C09B 67/0002; C09B 67/0085; C09B 67/0092; C09B 67/0082; D06P 1/16; D06P 3/8233; D06P 3/26; D06P 3/36; D06P 1/0016; D06P 1/46; D06P 1/525; D06P 1/5285; D06P 1/56; D06P 1/65118; D06P 1/65125; D06P 1/908; D06P 1/92; D06P 1/926; D06P 1/928; D06P 3/54; D06P 3/8214
USPC .......................................................... 8/456
See application file for complete search history.

(56) References Cited

U.S. PATENT DOCUMENTS

| | | | |
|---|---|---|---|
| 4,746,590 A | | 5/1988 | Kasai et al. |
| 5,593,459 A | * | 1/1997 | Gamblin ............. C09B 67/0084 106/31.35 |

FOREIGN PATENT DOCUMENTS

| | | | | |
|---|---|---|---|---|
| CN | 103938462 A | | 7/2014 | |
| CN | 103938463 A | | 7/2014 | |
| CN | 106459635 A | * | 2/2017 | ................. D06P 3/54 |
| CN | 106978740 A | | 7/2017 | |
| CN | 104530763 B | * | 10/2017 | ................. D06P 1/19 |
| CN | 108193518 A | * | 6/2018 | ................. D06P 5/30 |
| CN | 109135334 A | | 1/2019 | |

OTHER PUBLICATIONS

Wu et al., "Study on Waterless Dyeing Process of Polyester with Disperse Dyes in D5 under Normal Pressure and High Temperature," Journal of Zhejiang Sci-Tech University (Natural Sciences), Sep. 2015, vol. 33, No. 5, pp. 584-590, with an English translation of the abstract. (7 pages).
International Search Report (PCT/ISA/210) with an English translation and Written Opinion (PCT/ISA/237) dated Aug. 26, 2020, by the China National Intellectual Property Administration as the International Searching Authority for International Application No. PCT/CN2019/126807. (10 pages).

* cited by examiner

Primary Examiner — Eisa B Elhilo
(74) Attorney, Agent, or Firm — BUCHANAN, INGERSOLL & ROONEY PC

(57) ABSTRACT

The invention provides a disperse dye color paste for waterless dyeing, which comprises, by weight, 10%-40% of disperse dye filter cakes, 2%-35% of a dispersant, 5%-20% of a dyeing auxiliary, 0.1-0.5% of a surfactant, and 20%-88% of a solvent. The disperse dye color paste for waterless dyeing of the invention has a small particle size; and after waterless dyeing, a textile does not contain cleavable carcinogenic aromatic amine azo dyes, allergenic dyes, forbidden aromatic amine or bioactive substances. The disperse dye color paste for waterless dyeing of the invention can be stably stored for 6-12 months which is beneficial to the transportation of dyes and the production management of dyeing factories. Moreover, a dyeing effect featuring a high fixation rate is realized after the disperse dye color paste for waterless dyeing is applied to textiles.

8 Claims, No Drawings

DISPERSE DYE COLOR PASTE FOR WATERLESS DYEING, AND PREPARATION METHOD AND APPLICATION THEREOF

TECHNICAL FIELD

The invention relates to a liquid disperse dye, and a preparation method and application thereof, belonging to the field of dyeing and finishing. The liquid disperse dye is suitable for dyeing polyester and polyester blend fabric, especially for the waterless dyeing process.

BACKGROUND ART

The dyeing and finishing industry is one of the industries consuming a large amount of water, with 60-80 tons of water being consumed on average for producing per ton of fabric, which not only wastes precious water resources, but also causes massive wastewater discharge. Since the beginning of the 21st century, ecology and environment protection have become a common concern around the whole world, especially issues related to dyeing water. Taking the dyeing and finishing of polyester products with the largest output as an example. According to statistics, since 2005, China has exported 30 billion garments on average every year, of which polyester garments account for more than 50%. Assuming that each piece is 1 kg on average, hundreds of millions of tons of water consumption and sewage discharge have been caused from dyeing of polyester garment fabric alone. Great efforts have been made in controlling the pollution caused by polyester dyeing, including improving the processing technology to reduce water pollution in the production process, and investing huge manpower and financial resources for end treatment of sewage produced. These measures have achieved certain results, but due to the inherent shortcomings of traditional polyester dyeing methods, the water pollution situation can hardly be changed fundamentally.

The waterless dyeing process has changed this situation to a great extent. However, general powder or liquid disperse dyes cannot produce an ideal dyeing effect by the waterless dyeing process. Commercial disperse dyes can produce some color lakes in fiber in a waterless dyeing system, for which the main reason is that commercial disperse dyes are added with various dispersants of a water bath dyeing system, which are insoluble in the waterless dyeing system and accumulate on the surface of textiles, resulting in color spots. In addition, general liquid disperse dyes are not stable enough, thus tending to produce sediment in the storage process.

SUMMARY OF THE INVENTION

The purpose of the invention is to provide a disperse dye color paste for waterless dyeing, which has the advantages of being safe, nontoxic, stable, easy to store, excellent dyeing effect, and highly dye utilization rate.

To solve the above technical problems, the purpose of the invention is realized as follows.

Based on a total weight of the disperse dye color paste, the disperse dye color paste for waterless dyeing of the invention comprises, by weight,
10%-40% of disperse dye filter cakes,
2%-20% of a dispersant,
5%-20% of a dyeing auxiliary,
0.1-2% of a surfactant, and
20%-88% of a solvent.

On the basis of the above scheme and as a preferred scheme of the above scheme: the solvent is one of water, alcohol, alkane, ether, siloxane and sulfolane; the alcohol is one or a mixture of several of ethylene glycol, propylene glycol and diethylene glycol; the alkane is one or a mixture of several of isooctane, paraffin and white oil; and the ether is anisole or phenetole.

On the basis of the above scheme and as a preferred scheme of the above scheme, the dispersant is one or a combination of several of naphthalene sulfonate formaldehyde condensate, alkyl naphthalene sulfonate formaldehyde condensate, benzylnaphthalene sulfonate formaldehyde condensate, lignosulfonate, polycarboxylic acid ester, modified polyurethane and alkyl amine salt polymer.

On the basis of the above scheme and as a preferred scheme of the above scheme, the dyeing auxiliary is one or a combination of more than two of ethanol, glycerol, ethyl acetate and butyrolactone.

On the basis of the above scheme and as a preferred scheme of the above scheme, the surfactant is one or a combination of defoamer and emulsifier.

The invention relates to a preparation method of a disperse dye color paste for waterless dyeing, specifically comprising the following steps:

mixing disperse dye filter cakes, a dispersant, a dyeing auxiliary, a surfactant and deionized water in proportion, and grinding the mixture with grinding equipment to prepare a liquid disperse dye.

On the basis of the above scheme and as a preferred scheme of the above scheme, a particle size after grinding is 0.1-1 μm.

The invention relates to an application of a disperse dye color paste for waterless dyeing to dyeing of a textile.

On the basis of the above scheme and as a preferred scheme of the above scheme, the textile is hydrophobic fiber and hydrophobic fiber blend fabric.

The invention has the beneficial effects that: the liquid disperse dye color paste of the invention has a small particle size; and after dyeing, the textile does not contain cleavable carcinogenic aromatic amine azo dyes, allergy-inducing dyes, forbidden aromatic amine or bioactive substances. The disperse dye color paste for waterless dyeing of the invention can be stably stored for 6-12 months, which is beneficial to the transportation of dyes and the production management of dyeing factories. Moreover, a dyeing effect featuring a high fixation rate is realized after the disperse dye color paste is applied to textiles.

DETAILED DESCRIPTION OF THE INVENTION

The invention will be further described below with reference to specific embodiments.

Embodiment 1

200 g of Disperse Red 167, 40 g of polycarboxylic acid ester, 4 g of a defoamer and 756 g of deionized water were mixed, pre-dispersed and then added into a sand mill to be ground to obtain a Disperse Red 167 disperse dye color paste. The particle size ranged from 0.1 μm to 1 μm after grinding.

Embodiment 2

200 g of Disperse Red 167, 40 g of alkylamine salt, 200 g of ethyl acetate, 4 g of a defoamer and 556 g of deionized water were mixed, pre-dispersed and then added into a sand mill to be ground to obtain a Disperse Red 167 disperse dye color paste. The particle size ranged from 0.1 μm to 1 μm after grinding.

Comparative Example 1

200 g of Disperse Red 167, 40 g of peregal 0, 4 g of a defoamer and 756 g of water were mixed, pre-dispersed and then added into a sand mill to be ground to obtain a Disperse Red 167 disperse dye color paste.

Comparative Example 2

200 g of Disperse Red 167, 40 g of CNF, 4 g of a defoamer and 756 g of water were mixed, pre-dispersed and then added into a sand mill to be ground to obtain a Disperse Red 167 disperse dye color paste.

A performance test was conducted on the disperse dye color pastes of Embodiments 1-2 and Comparative examples 1-2. Specifically, the dye sediment condition of Embodiments 1-2 and Comparative examples 1-2 was observed, and sedimentation time was compared.

The dyes of Embodiments 1-2, the dyes of Comparative examples 1-2 and a powder dye with the same composition were used to dye textiles based on a weight proportion of 1:100 using a waterless dyeing method. The textiles used in Embodiments 1-2 and Comparative examples 1-2 were made of hydrophobic fiber, specifically polyester fiber.

According to GB/T 8424-1987 "Textiles—Method for the measurement of color and color differences", the difference between inner and outer layers of dyed textiles (represented by E, the greater the value, the greater the difference) and the presence of dye accumulation in textiles were determined. See Table 1 for specific data.

Table 1

| | Sedimentation time | Difference between inner and. outer layers | Dye accumulation inside |
|---|---|---|---|
| Embodiment 1 | 6 months | 1-3 | No |
| Embodiment 2 | 6 months | 0.2-0.8 | No |
| Comparative example 1 | within 1 month | Above 4 | Yes |
| Comparative example 2 | Within 2 month | Above 4 | Yes |
| Powder dye | / | Above 4 | Yes |

In Embodiments 3-10, disperse dye color paste for waterless dyeing were prepared according to the composition formulas in Table 2, and a dye, a dispersant, a dyeing auxiliary and a surfactant were pre-dispersed in a solvent and ground to obtain the disperse dye color paste for waterless dyeing. The particle size ranged from 0.1 μm to 1 μm after grinding.

TABLE 2

| Embodiment | Type of dye | Amount of dye | Dispersant | Dyeing auxiliary | Surfactant | Solvent |
|---|---|---|---|---|---|---|
| 3 | Red 167 | 150 g | 30 g | 150 g | 3 g | 667 g |
| 4 | Orange 30 | 150 g | 30 g | 150 g | 3 g | 667 g |
| 5 | Orange 30 | 200 g | 40 g | 200 g | 4 g | 556 g |
| 6 | Blue 79 | 150 g | 30 g | 150 g | 3 g | 667 g |
| 7 | Blue 79 | 200 g | 40 g | 200 g | 4 g | 556 g |
| 8 | Orange 30, Blue 79 | 100 g | 20 g | 200 g | 20 g | 660 g |
| 9 | Red 167, Orange 30 | 300 g | 200 g | 50 g | 1 g | 449 g |
| 10 | Red 167, Blue 79 | 400 g | 150 g | 100 g | 10 g | 340 g |

In Embodiment 3, the solvent used was water, the dispersant was naphthalene sulfonate formaldehyde condensate, the dyeing auxiliary was ethanol, and the surfactant was a defoamer.

In Embodiment 4, the solvent used was alcohol, specifically ethylene glycol, the dispersant was alkyl naphthalene sulfonate formaldehyde condensate, the dyeing auxiliary was glycerol, and the surfactant was a mixture of a defoamer and an emulsifier based on a ratio of 1:1.

In Embodiment 5, the solvent used was alcohol, specifically propylene glycol and diethylene glycol, which were mixed according to a weight ratio of 1:3, the dispersant was prepared by mixing alkyl naphthalene sulfonate formaldehyde condensate and benzylnaphthalene sulfonate formaldehyde condensate according to a weight ratio of 1:2, the dyeing auxiliary was ethyl acetate, and the surfactant was an emulsifier.

In Embodiment 6, the solvent used was alkane, specifically isooctane, the dispersant was prepared by mixing lignosulfonate, polycarboxylic acid ester and modified polyurethane according to a weight ratio of 1:1:1, the dyeing auxiliary was prepared by mixing ethyl acetate and butyrolactone according to a weight ratio of 1:2, and the surfactant was a defoamer.

In Embodiment 7, the solvent used was alkane, specifically paraffin and white oil, which were mixed according to a weight ratio of 1:2, the dispersant was prepared by mixing modified polyurethane and alkyl amine salt according to a weight ratio of 1:1, the dyeing auxiliary was butyrolactone, and the surfactant was prepared by mixing a defoamer and an emulsifier according to a weight ratio of 1:2.

In Embodiment 8, the solvent used was ether, which may be anisole or phenethyl ether, specifically anisole, the dispersant was prepared by mixing naphthalene sulfonate formaldehyde condensate, lignosulfonate and polycarboxylic acid ester according to a weight ratio of 1:2:2, the dyeing auxiliary was prepared by mixing ethanol, glycerol and ethyl acetate according to a weight ratio of 1:1:2, and the surfactant was a defoamer.

In Embodiment 9, the solvent used was sulfolane, the dispersant was prepared by mixing polycarboxylic acid ester and modified polyurethane according to a weight ratio of 1:1, the dyeing auxiliary was prepared by mixing glycerol, ethyl acetate and butyrolactone according to a weight ratio of 1:1:1, and the surfactant was a defoamer.

In Embodiment 10, the solvent used was siloxane, the dispersant was benzylnaphthalene sulfonate formaldehyde condensate, the dyeing auxiliary was ethyl acetate, and the surfactant was an emulsifier.

Embodiments 3-10 were used to dye textiles based on a weight proportion of 1:100 using a waterless dyeing method. The textiles used in Embodiments 3 and 4 were made of hydrophobic fiber, specifically nylon. The texnylontiles used in Embodiments 5 and 6 were made of polyester and nylon blended yarn. The textiles used in Embodiments 7 and 8 were made of polyester and cotton fiber blended yarn. The textiles used in Embodiments 9 and 10 were made of core-spun yarn, which used polyester and cotton blended yard as a coating layer and T400 filaments as core yard.

The performance of the disperse dye color pastes of Embodiments 3-10 was tested by the same method as Embodiments 1-2, and the specific data are shown in Table 3.

Table 3

| Embodiment | Sedimentation time | Difference between inner and outer layers | Dye accumulation inside |
| --- | --- | --- | --- |
| Embodiment 3 | 6 months | 0.2-0.8 | No |
| Embodiment 4 | 6 months | 0.1-0.8 | No |
| Embodiment 5 | 6 months | 0.1-0.8 | No |
| Embodiment 6 | 6 months | 0.2-0.8 | No |
| Embodiment 7 | 6 months | 0.2-0.8 | No |
| Embodiment 8 | 6 months | 0.1-0.8 | No |
| Embodiment 9 | 6 months | 0.1-0.8 | No |
| Embodiment 10 | 6 months | 0.1-0.8 | No |

As can be seen from Table 1, compared with traditional liquid dyes, the disperse dye color paste obtained by using the formula and manufacturing process of the invention takes much longer time to produce sediment, which greatly facilitates the storage and transportation of dyes. In addition, the dye obtained by using the formula and manufacturing process of the invention has a better level dyeing property in the waterless dyeing process.

As can be seen from Table 3, the formula and manufacturing process of the invention are suitable for disperse dye color pastes in different colors, and can meet the requirements for different colors in the production process.

The preferred embodiments of the invention have been described in detail above. It should be understood that those of ordinary skill in the art can make many modifications and changes according to the concept of the invention without creative labor. Therefore, all technical schemes that can be obtained by those skilled in the art through logical analysis, reasoning or limited experiments based on the concept of the invention should be within the scope of protection determined by the claims.

The invention claimed is:

1. A disperse dye color paste for waterless dyeing, comprising, by weight, based on a total weight of the disperse dye color paste,
   10%-40% of a disperse dye filter cakes,
   2%-20% of a dispersant,
   5%-20% of a dyeing auxiliary,
   0.1-2% of a surfactant, and
   20%-88% of a solvent,
   wherein the solvent is one of alcohol, alkane, ether, siloxane and sulfolane; the alcohol is one or a mixture of several of ethylene glycol, propylene glycol and diethylene glycol; the alkane is one or a mixture of several of isooctane, paraffin and white oil; and the ether is anisole or phenetole.

2. The disperse dye color paste for waterless dyeing according to claim 1, wherein the dispersant is one or a combination of several of naphthalene sulfonate formaldehyde condensate, alkyl naphthalene sulfonate formaldehyde condensate, benzylnaphthalene sulfonate formaldehyde condensate, lignosulfonate, polycarboxylic acid ester, modified polyurethane and alkyl amine salt polymer.

3. The disperse dye color paste for waterless dyeing according to claim 1, wherein the dyeing auxiliary is one or a combination of more than two of ethanol, glycerol, ethyl acetate and butyrolactone.

4. The disperse dye color paste for waterless dyeing according to claim 1, wherein the surfactant is one or a combination of defoamer and emulsifier.

5. A preparation method of the disperse dye color paste for waterless dyeing according to claim 1, comprising the following steps:
   mixing disperse dye filter cakes, a dispersant, a dyeing auxiliary, a surfactant and deionized water in proportion, and grinding a mixture with grinding equipment to prepare a liquid disperse dye.

6. The preparation method according to claim 5, wherein a particle size after grinding is 0.1-1 μm.

7. An application of the disperse dye color paste for waterless dyeing according to claim 1 to dyeing of a textile.

8. The application of the disperse dye color paste for waterless dyeing according to claim 7, wherein the textile is hydrophobic fiber and hydrophobic fiber blend fabric.

* * * * *